United States Patent [19]
Nakajima et al.

[11] Patent Number: 5,818,602
[45] Date of Patent: Oct. 6, 1998

[54] DIGITAL COPY MACHINE HAVING EFFICIENT DUPLEXING CAPABILITIES

[75] Inventors: Akio Nakajima; Takeshi Morikawa, both of Toyokawa, Japan

[73] Assignee: Minolta Co., Ltd., Osaka, Japan

[21] Appl. No.: 359,045

[22] Filed: Dec. 19, 1994

[30] Foreign Application Priority Data

Mar. 4, 1994 [JP] Japan .................................. 6-034885

[51] Int. Cl.⁶ .............................. H04N 1/04; H04N 1/40; G03G 21/00
[52] U.S. Cl. ........................ 358/296; 358/401; 358/444; 358/498; 399/364
[58] Field of Search .................................. 358/296, 401, 358/404, 426, 444, 468, 471, 474, 486, 494, 498, 539; 355/23, 24, 77; 382/232, 237, 251; 399/38, 46, 83, 364, 381

[56] References Cited

U.S. PATENT DOCUMENTS

| | | | |
|---|---|---|---|
| 4,860,119 | 8/1989 | Maniwa et al. ......................... | 358/296 |
| 5,055,946 | 10/1991 | Kurahashi et al. ..................... | 358/498 |
| 5,095,369 | 3/1992 | Oritz et al. ............................. | 358/296 |
| 5,491,557 | 2/1996 | Nakajima et al. ...................... | 358/296 |
| 5,598,271 | 1/1997 | Ohtani .................................... | 358/296 |

FOREIGN PATENT DOCUMENTS 5-183706  7/1993  Japan .............................. H04N 1/21

Primary Examiner—Eric Frahm
Attorney, Agent, or Firm—Sidley & Austin

[57] ABSTRACT

In printing both sides of plural sheets of paper by using a digital copy machine having a circulating-type duplexing unit, when a back face of the first page is printed after printing a front face thereof, if it is likely to collide with a sheet of paper for the second page, priority is given to printing of the back face of the first page. If the front faces of both first and second pages are already printed, then control proceeds so as not to collide with the sheet of paper for the back face of the second page irrespective of delay in printing the back face of the first page.

12 Claims, 21 Drawing Sheets

1000 COPY MACHINE

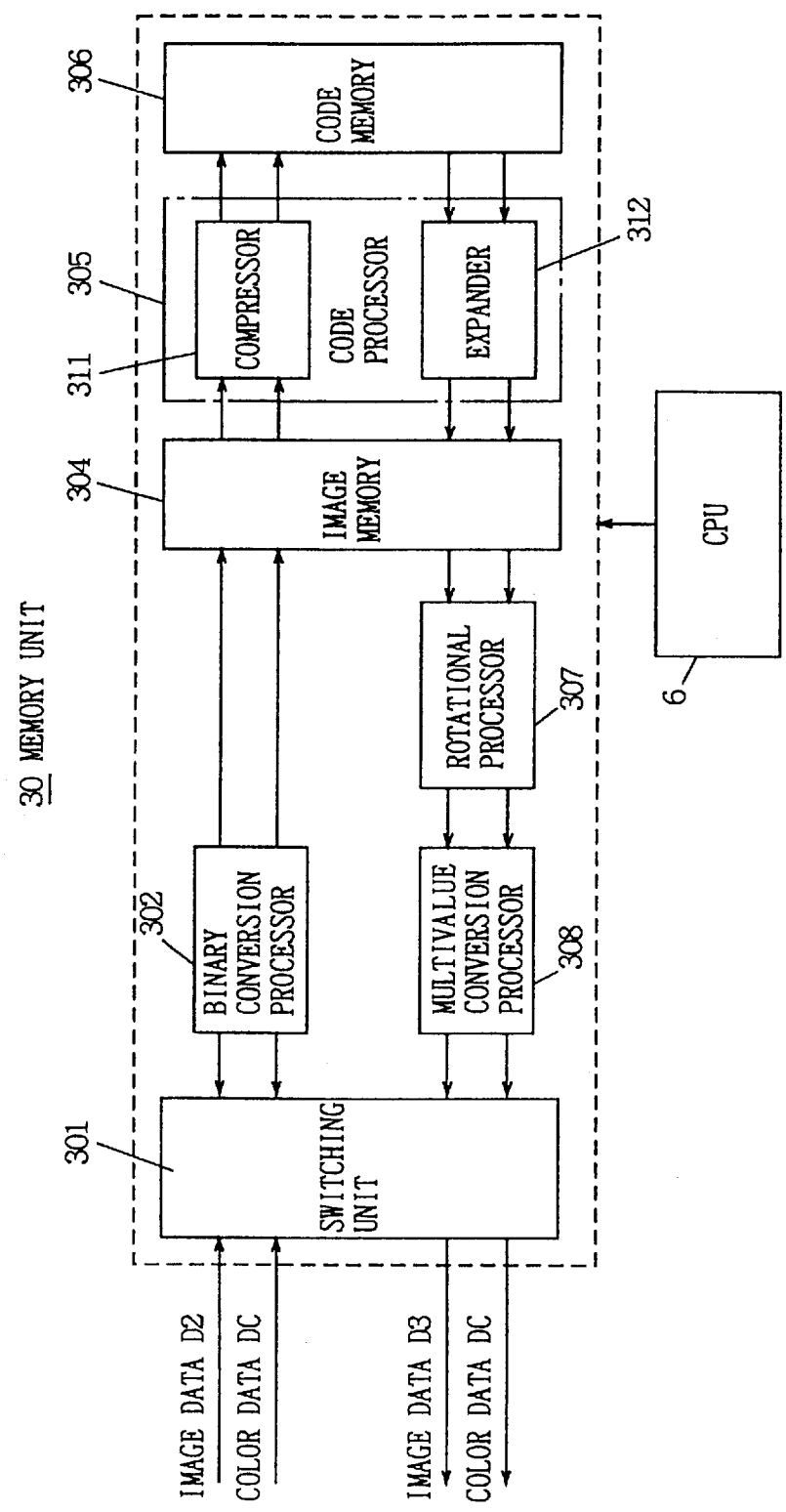

| REGION | PAGE | ASSOCIATION WITH PREVIOUS REGION | ASSOCIATION WITH SUCCEEDING REGION | COMPRESSION TIME | COPY |
|---|---|---|---|---|---|
| 00 | 1 | 00 | 01 | $x_{11}$ | 1ST FACE |
| 01 | 1 | 01 | FF | $x_{12}$ | 2ND FACE |
| 02 | 2 | 00 | 03 | $x_{21}$ | 1ST FACE |
| 03 | 2 | 03 | FF | $x_{22}$ | 2ND FACE |
| 04 | 3 | 00 | 05 | $x_{31}$ | 1ST FACE |
| 05 | 3 | 05 | FF | $x_{32}$ | 2ND FACE |

MT1

306 CODE MEMORY

| | |
|---|---|
| 0 | |
| | COMPRESSION DATA 1 OF PAGE 1 |
| 32K | |
| | COMPRESSION DATA 2 OF PAGE 1 |
| 64K | |
| | COMPRESSION DATA 1 OF PAGE 2 |
| 96K | |
| | COMPRESSION DATA 2 OF PAGE 2 |
| 128K | |

MEMORY MODE WRITING OPERATION

MEMORY MODE READING OPERATION

5,818,602

DIGITAL COPY MACHINE HAVING EFFICIENT DUPLEXING CAPABILITIES

BACKGROUND OF THE INVENTION

1. Field of the Invention

The present invention relates to digital copy machines, and more particularly, to a digital copy machine having a circulating-type duplex function.

2. Description of the Background Art

Conventionally, digital copy machines having a circulating-type duplex function have been proposed. In such digital copy machines, image data read by an image reader (IR) is compressed once to be stored in a memory and is then read expanded from the memory to be supplied to a printer for printing. As a result, the image reader and the printer can be controlled independently and in parallel, thereby improving productivity of duplex copies. In such machines, typically, once a maximum containing number of sheets is calculated based on paper size, the determined containing number of sheets are fed from a paper feed cassette to a loop path, and those sheets are later refed from the loop path.

In the conventional digital copy machines having the circulating-type duplex function structured as above, however, only the determined containing number of sheets to the loop are under control during paper feed. Also, a time taken for expansion of data read from a code memory is usually varied for every sheet of paper, because data to be printed is often different for every sheet of paper except for a multi-copy (i.e., copying a plurality of original images on one sheet of paper). Therefore, conventional digital copy machines take more time for expansion of data depending on the data to be printed, if sheets are fed from the paper feed cassette uniformly until the containing number of sheets are fed. This might increase an interval between paper feed, such that sheets of paper fed from the paper feed cassette after expansion of data might collide with refed sheets from the loop path even if the number of sheets fed from the paper feed cassette is less than the maximum containing number of sheets.

Even if no such collision has occurred, it takes time to expand data with respect to a sheet fed from the paper feed cassette and sheets of paper are refed from the loop path at a predetermined timing, whereby expansion of image data to be printed on the refed sheet of paper may not be carried out in time and a back face of the sheet may not be copied. The interval between paper feed can be increased to give extra time for expansion of the image data in order to avoid the above problem; however, in that case, productivity of duplex copies will be decreased.

SUMMARY OF THE INVENTION

An object of the present invention is therefore to provide a digital copy machine capable of effectively copying both sides of originals.

Another object of the present invention is to provide a digital copy machine having a duplex capability, which is further capable of corresponding flexible variation of original image data without decreasing productivity of duplex copies.

In a digital copy machine according to the present invention, whether sheets of paper are fed from a paper feed cassette or a paper refeeding path is selected based on an expansion time of data for every page stored in a memory.

Accordingly, a collision of sheets of paper can be avoided even though the image data of an original is varied, without unnecessarily decreasing productivity of duplex copies. At the same time copying of sheets of paper being fed can be ensured. Consequently, a digital copy machine capable of effectively copying both-sides of an original can be provided.

Preferably, an expansion time can be known in advance, because the expansion time is estimated based on a compression time detected. This ensures duplexing to be carried out as planned.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a block diagram showing a memory unit.

DESCRIPTION OF THE PREFERRED EMBODIMENTS

Figure 1:
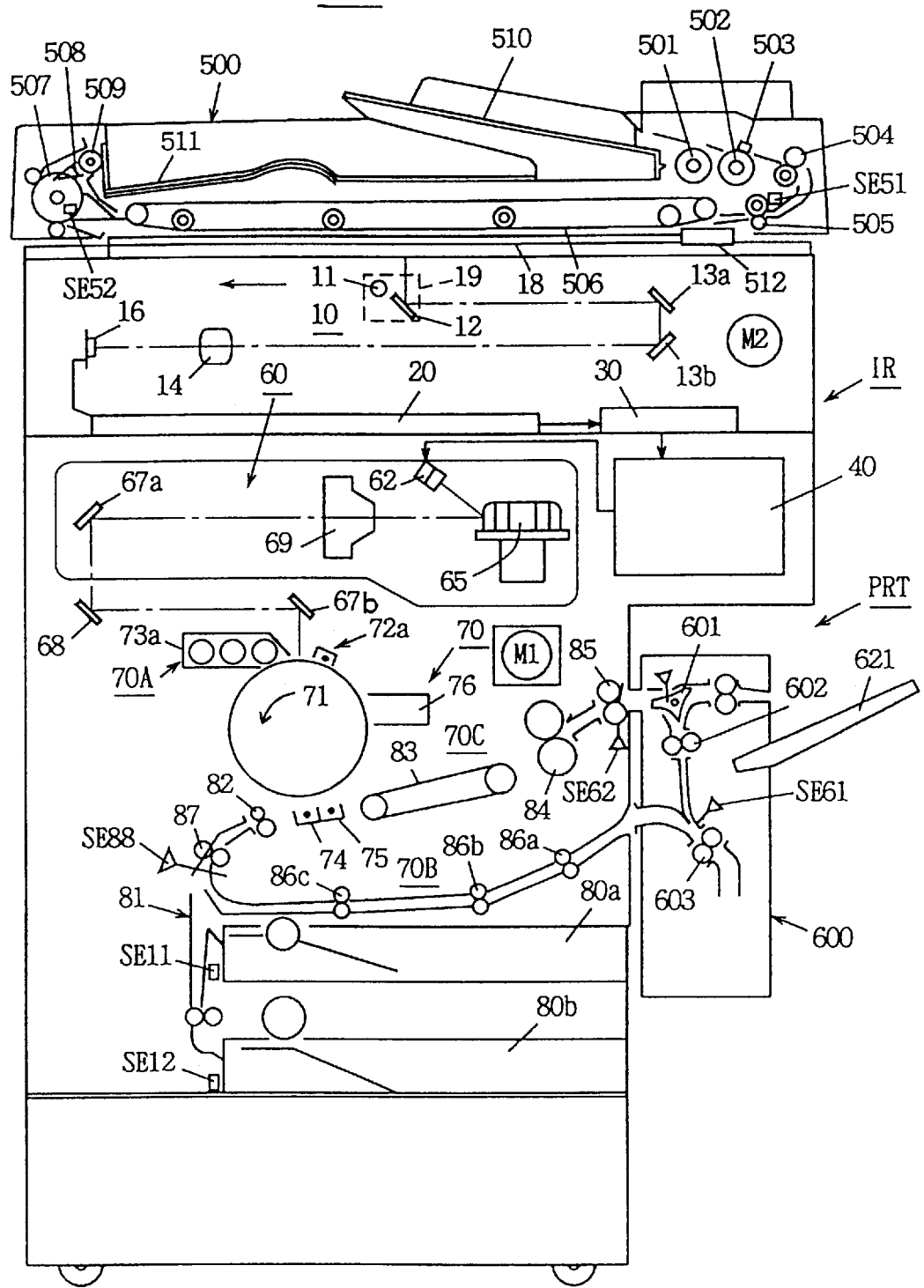
FIG. 1 is a cross sectional view showing an overall structure of a copy machine according to the present invention.

Now, embodiments of the present invention will be described below with reference to the drawings.

Referring to FIG. 1000, a copy machine 1 includes: a scanning system 10 for reading an original and converting the original into an image signal; an image signal processing unit 20 for processing the image signal supplied from scanning system 10; a memory unit 30 including a switch so that image data input from image signal processing unit 20 is output to a printer without conversion or is stored in memory; a print processing unit 40 for driving a semiconductor laser 62 in response to the image data input from memory unit 30; an optical system 60 for directing a laser from semiconductor laser 62 to an exposure position provided on a photoreceptor drum 71; an image forming system 70 for developing, transferring and fixing latent image, formed by exposure, onto a sheet of paper; an operation panel OP (FIG. 2) provided on a top surface of a main body of the machine 1000; a document feeding unit 500 for feeding an original and for reversing the original if necessary; and a paper refeeding unit 600 for refeeding sheets of paper to a transfer position.

It is noted that an image reader IR is formed by scanning system 10, image signal processing unit 20 and the like, and that a printer PRT is formed by print processing unit 40, optical system 60, image forming system 70 and the like.

Scanning system 10 is formed by an exposure lamp 11 together with a first mirror 12 which are mounted on a scanner 19 moving below a platen glass 18, fixed mirrors 13a and 13b, a condenser lens 14, a photoelectric conversion element 16 implemented by use of, for example, a CCD array, a scan motor M2, and the like.

Photoelectric conversion element 16 is provided for respectively converting an image of an original of an unspecified color, but mainly consisting of black and an image of a specified color (red) into electric signals.

Image signal processing unit 20 is provided for processing image signals output from photoelectric conversion element 16 and for outputting image data to memory unit 30 which will be described later in detail.

Print processing unit 40 supplies the provided image data to semiconductor laser 62 depending on what image data is provided. Optical system 60 consists of semiconductor laser 62, a polygon mirror 65 for biasing a combined laser beam, a main lens 69, reflection mirrors 67a, 67b and 68, and the like.

Image forming system 70 consists of a develop/transfer system 70A, a transport system 70B and a fixing system 70C.

Develop/transfer system 70A includes photoreceptor drum 71 driven to be rotated counterclockwise (as shown in FIG. 1) together with a first corona charger 72a, a first developing unit 73a, transfer charger 74, a separation charger 75, a cleaning unit 76, and the like which are provided along the circumference of photoreceptor drum 71 successively from upstream of rotation. Accommodated in first developing unit 73a is a two-component developer consisting of toner and a carrier.

Transport system 70B consists of cassettes 80a and 80b for accommodating sheets of paper, size detection sensors SE11 and SE12 for detecting paper size, a paper guide 81, a timing roller 82, a transport belt 83, horizontal transport rollers 86a–86c for transporting sheets of paper fed from paper refeeding unit 600, and the like.

Fixing system 70C consists of a fixing roller 84 for transporting sheets of paper while compressing and heating the sheets, a discharge roller 85, a discharge sensor SE62 for detecting paper discharge, and the like.

Paper refeeding unit 600 is of a circulating type which temporarily accommodates a sheet of paper discharged from discharge roller 85 and transports the sheet to horizontal transport roller 86a within transport system 70B for forming an image again (i.e., for printing), with the sheet being reversed in a duplex mode or without the sheet being reversed in a composite mode. Paper refeeding unit 600 consists of a switching claw 601 for switching from discharging to a discharge tray 621 to refeeding, a transport roller 602, a reversing roller 603, a reverse sensor SE61, and the like.

In the duplex mode, a left end portion of switching claw 601 is moved upward by a solenoid which is not shown. Accordingly, the sheet of paper discharged from discharge roller 85 is guided to transport roller 602 to reach reversing roller 603 through transport roller 602.

When a rear end of the sheet reaches reverse sensor SE61, reverse roller 603 starts reversing, whereby the sheet is transported to horizontal transport roller 86a so that the sheet passes through horizontal transport rollers 86b and 86c and intermediate roller 87 to reach timing roller 82 where the sheet stands by and awaits further processing. At this time, the next sheet of paper is being transported successively at a predetermined interval, so that the number of simplex-copied sheets capable of standing by depends on a length of the sheet, given no delay of the image data. It is noted that a sensor SE88 for detecting a head of the supplied sheet is provided before intermediate roller 87.

Document feeding unit 500 automatically feeds an original set on a document feed tray 510 onto platen glass 18 and discharges the original to a document discharging unit 511 after reading the original by scanner 19.

Document feeding unit 500 consists of a paper feed roller 501, a sort roller 502, a sort pad 503, an intermediate roller 504, a resist roller 505, a transport belt 506, a reversing roller 507, a switching claw 508, a discharge roller 509, a paper feed tray 510, a paper discharge tray 511, a document scale 512, a paper feed sensor SE51, a paper discharge sensor SE52, and the like.

In the simplex mode for reading only one side of the original, one or a plurality of documents are set on paper feed tray 510 with a face of the original desired to be read ("reading face") facing upward. Upon starting of operation, set originals are fed successively from the bottom of the originals by paper feed roller 501 so as to be positioned on platen glass 18 in place. At this time, the head of the next original already reaches resist roller 505, thereby reducing time necessary to feed the next original.

In this state, scanner 19 carries out scanning for reading a reading face (now bottom surface) of the original. Upon completion of reading the original, the original is transported leftward by transport belt 506, turned by reversing roller 507, and then discharged by discharge roller 509 over switching claw 508 to paper discharge tray 511. Note that the original is discharged with the reading face thereof facing upward.

Figure 2:
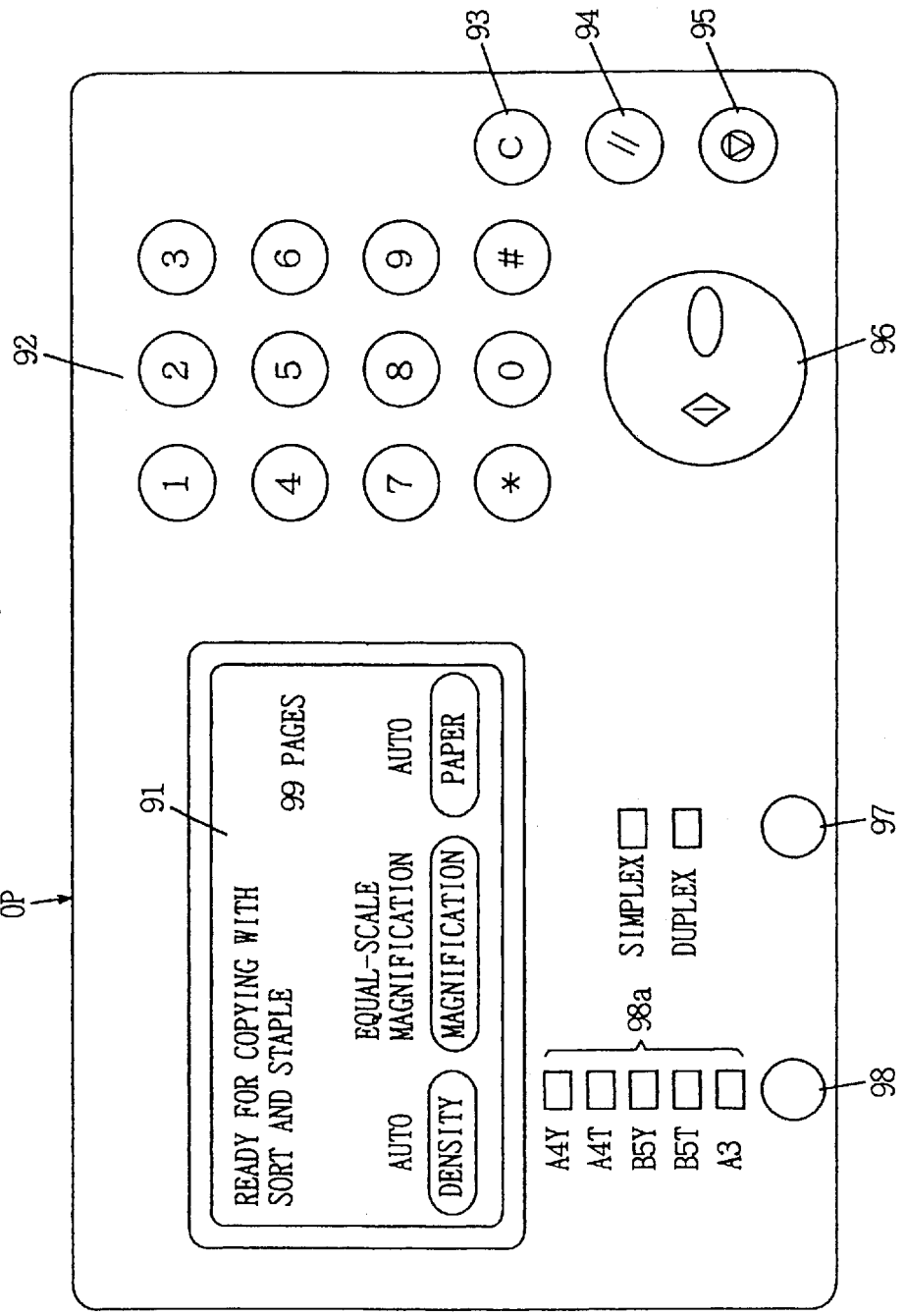
FIG. 2 is a front view of an operation panel of the copy machine according to the present invention.

FIG. 2 is a front view of operation panel OP. Referring to FIG. 2, operation panel OP includes: a liquid crystal touch panel 91; a ten key 92 for inputting numbers and magnification; a clear key 93 for returning a number into a standard value "1"; a panel reset key 94 for returning a set value and the like to a standard value; a stop key 95 for stopping a copying operation; a start key 96 for starting a copying operation; a mode set key 97 for setting a copy mode; and a paper select key 98 for selecting a type of paper. The paper to be selected by paper select key 98 is displayed in a paper size display 98a. It is noted herein that, for instance, A4Y represents an A4 size sheet being laterally mounted and B5T represents a B5 size sheet being longitudinally mounted.

Also, it is noted that 'laterally mounted' means that an elongated side of the sheet is perpendicular to the paper feed direction, and 'longitudinally mounted' means that the elongated side of the sheet is oriented in the paper feed direction.

Liquid crystal touch panel 91 serves to display various conditions of copy machine 1000 such as a paper jam occurrence, serviceman call necessary and empty paper cassettes 80a, 80b. Also displayed are operating modes of copy machine 1000 such as exposure level, magnification, and types of sheets as well as other various information. Inputs for selecting the operating mode are also made by panel 91.

Figure 3:
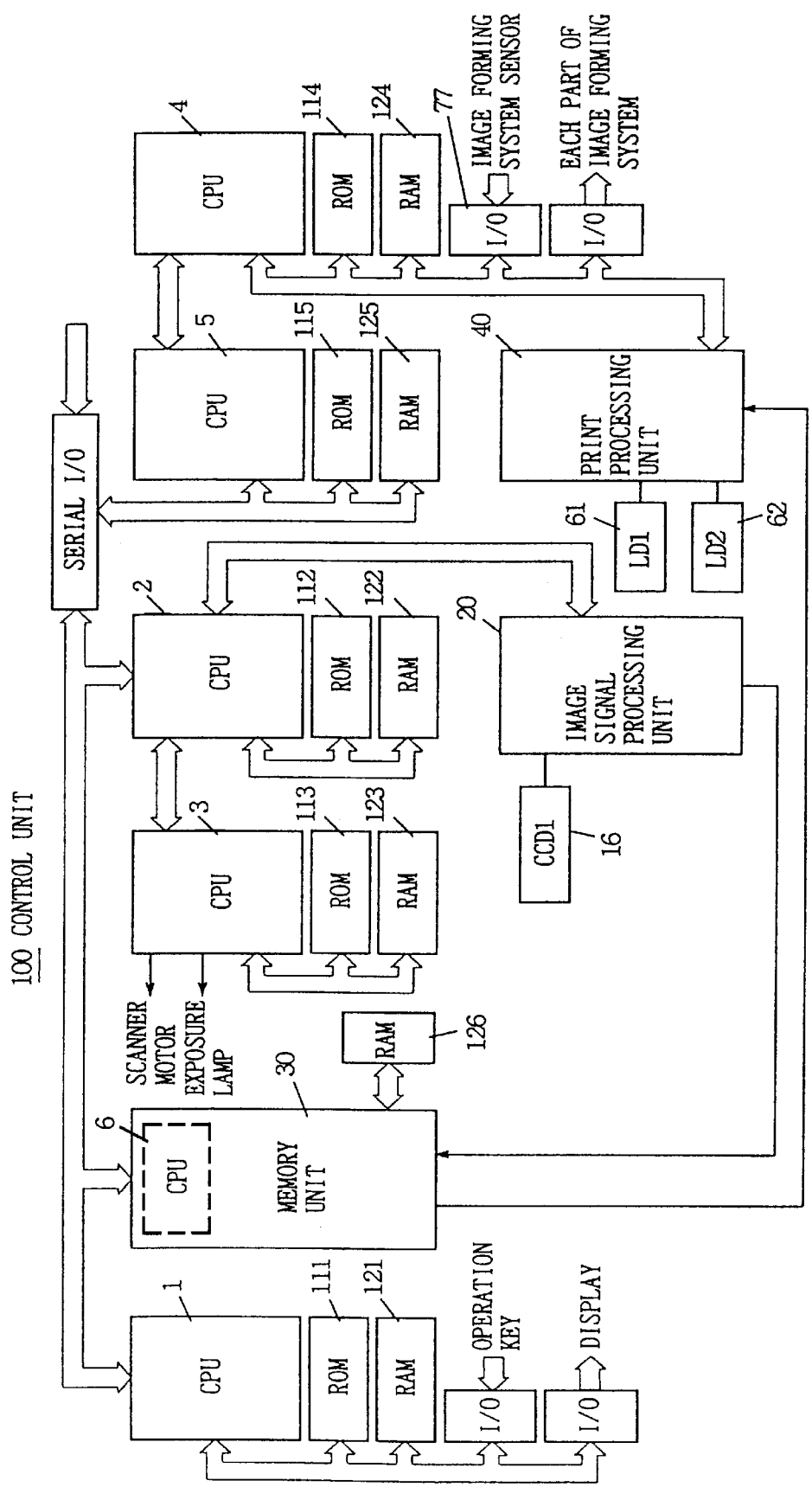
FIG. 3 is a block diagram showing a structure of a control unit of the copy machine.
Figure 4:
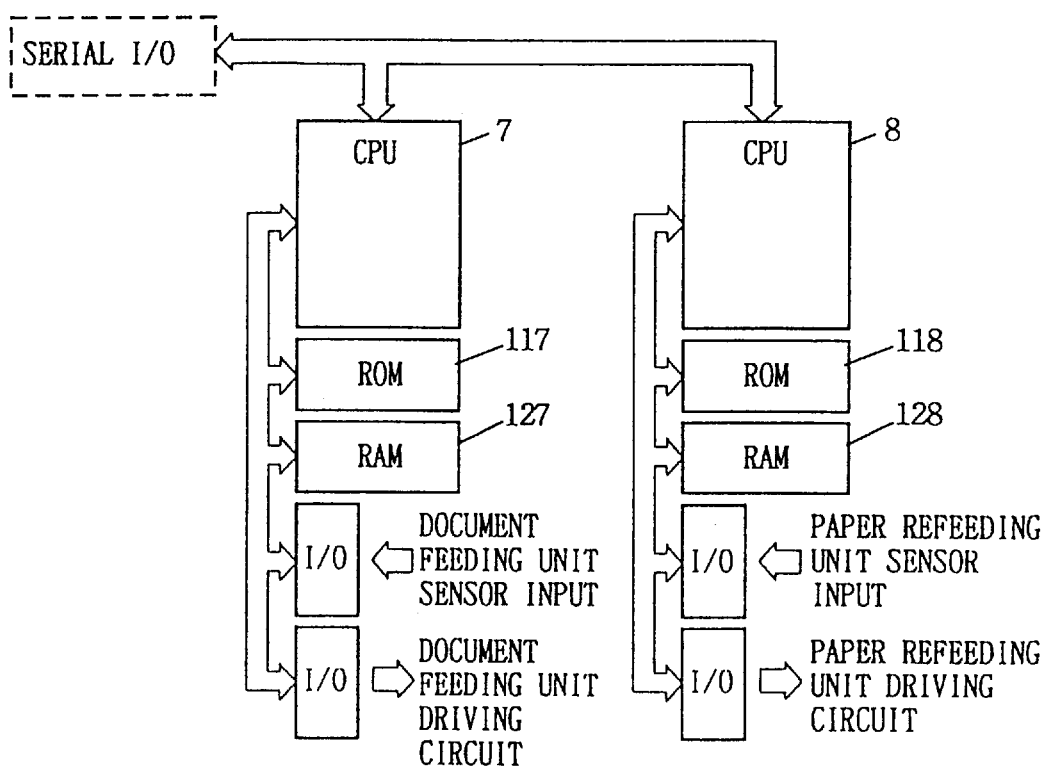
FIG. 4 is a block diagram showing a structure of a control unit of the copy machine.

Now, a control unit 100 will be described below. FIGS. 3 and 4 are block diagrams showing the structure of control unit 100 of copy machine 1000.

Control unit 100 is formed mainly by 8 CPUs 1–8, these CPUs 1–8 being provided with ROMs 111–118 in which programs are stored, and RAMs 121–128 serving as work areas for program execution, respectively. It is noted that CPU 6 is provided within memory unit 30 (see FIG. 5).

CPU 1 controls signal inputs by various operating keys provided on operation panel OP and also controls display. CPU 2 controls respective parts of image signal processing unit 20, and CPU 3 controls driving of scanning system 10. CPU 4 controls print processing unit 40, optical system 60 and image forming system 70, and CPU 5 carries out processing for setting an operating mode or adjusting an overall timing of control unit 100.

CPU 6 controls memory unit 30 so as to temporarily store the read image data to a memory (image memory 304), and to read the image data for output to print processing unit 40. By doing this, CPU 6 controls image reader IR and printer PRT independently in order for improving copying speed, which will be described later in detail.

CPU 7 controls document feeding unit 500, and CPU 8 controls paper refeeding unit 600. Serial communication by interruption is carried out among these CPUs 1–8 so as to receive commands, reports, and other data.

It is noted that signals supplied from paper size detection sensors SE11 and SE12 are input to an image forming system sensor I/O 77, and the size of sheets for use in copying is controlled by CPU 4.

Now, respective processing units for processing image data will be described below. First, image signal processing unit 20 consists of an A/D converter, a shading corrector, a color determinator for determining colors of pixels of the original based on the image data, a variable scale magnification processing unit, a picture quality corrector, and the like.

The image signal input from photoelectric conversion element 16 is quantized into 8 bit image data for every pixel by image signal processing unit 20. The 8 bit image data is then subject to various processings and output as image data D2. At the same time, 1 bit color data DC is output indicating if each pixel in image data D2 corresponds to the designated specified color.

Now, memory unit 30 will be described with reference to FIG. 5 in which a block diagram of memory unit 30 is shown.

Memory unit 30 includes: a switching unit 301, a binary conversion processor 302 for producing binary data based on parameter setup from CPU 6, a multiport image memory 304 having a capacity equivalent to 1 page of an A4 size sheet at 400 dpi; a code processor 305 having a compressor 311 and an expander 312 capable of operating independently; a multiport code memory 306; a rotational processor 307, a multivalue processor 308 for producing multivalue data based on parameter setup from CPU 6, and CPU 6 for use in overall control of the above.

In this embodiment, compressor 311 and expander 312 are implemented by identical hardware circuits.

As such, two hard circuits are used as the code processor wherein each circuit is connected to a compressing bus and an expanding bus, whereby compressing and expanding operations can be controlled independently and in parallel. Also, the hard circuit of the identical structure is used for compressor 311 and expander 312, such that the time taken for carrying out the compression processing is the same as that for the expanding processing.

Such a structure is advantageous over the structure in which code processor 305 is implemented by a single hard circuit which has both compression and expansion functions, whereby inconveniences such as no compression during expansion or no expansion during compression will not occur. As a result, the time required to complete compression does not have to be considered as the time for expansion.

Also, it is noted that binarization carried out in binary conversion processor 302 is not a simple binarization, but rather such a binarization as to binarize pseudo-halftones (e.g., the dither method).

Once image data D2 is written in image memory 304, code processor 305 reads and compresses the data to produce code data and writes the code data into code memory 306. Also, in accordance with an instruction from CPU 6, the code data written in code memory 306 is read out and expanded so that image data is produced to be written in image memory 304.

When the image data equivalent to 1 page is produced by expansion in image memory 304, the image data is read out and rotary-processed in rotational processor 307, if necessary. Multivalue processor 308 produces multivalue image data which is output as image data D3. Since compressor 311 and expander 312 are able to operate independently and in parallel, data can be transferred between these units and code memory 306 by means of a DMA transfer.

Figures 6A, 6B:
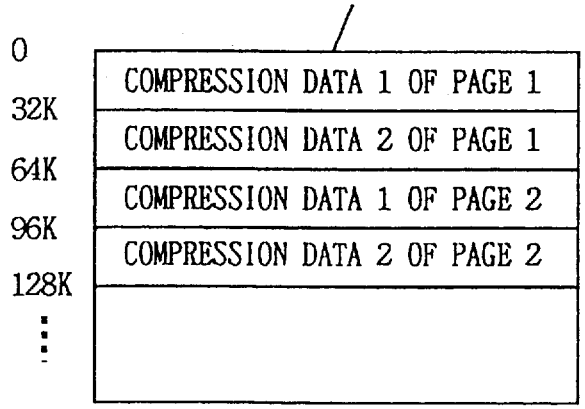
FIGS. 6a and 6b are tables showing relationship between a management table and a code memory.

FIG. 6a and 6b show a relationship between management table MT1 and code memory 306. Code memory 306 is divided into memory regions by a 32K byte unit as shown in FIG. 6b. Code data for every page is stored in each region in order for allowing simultaneous control of writing (upon read out) and reading (upon printing).

As can be seen from FIG. 6a, management table MT1 stores the number indicating a region of code memory 306, the page number, the number of the associated region, and various additional information necessary for compression/expansion, for example, the compression time and the types of copying sheets. Code memory 306 is dynamically controlled based on this information.

When reading the image data from image memory 304 for compression, CPU 6 produces the information included in management table MT1, while also controlling compressor 311 to store the information in code memory 306. On the other hand, when outputting the image data, CPU 6 reads the code data from code memory 306 by means of an operation reversal to the above. The information included in management table MT1 is deleted when information of a corresponding page is discharged normally for all the necessary number of sheets.

Figure 7:
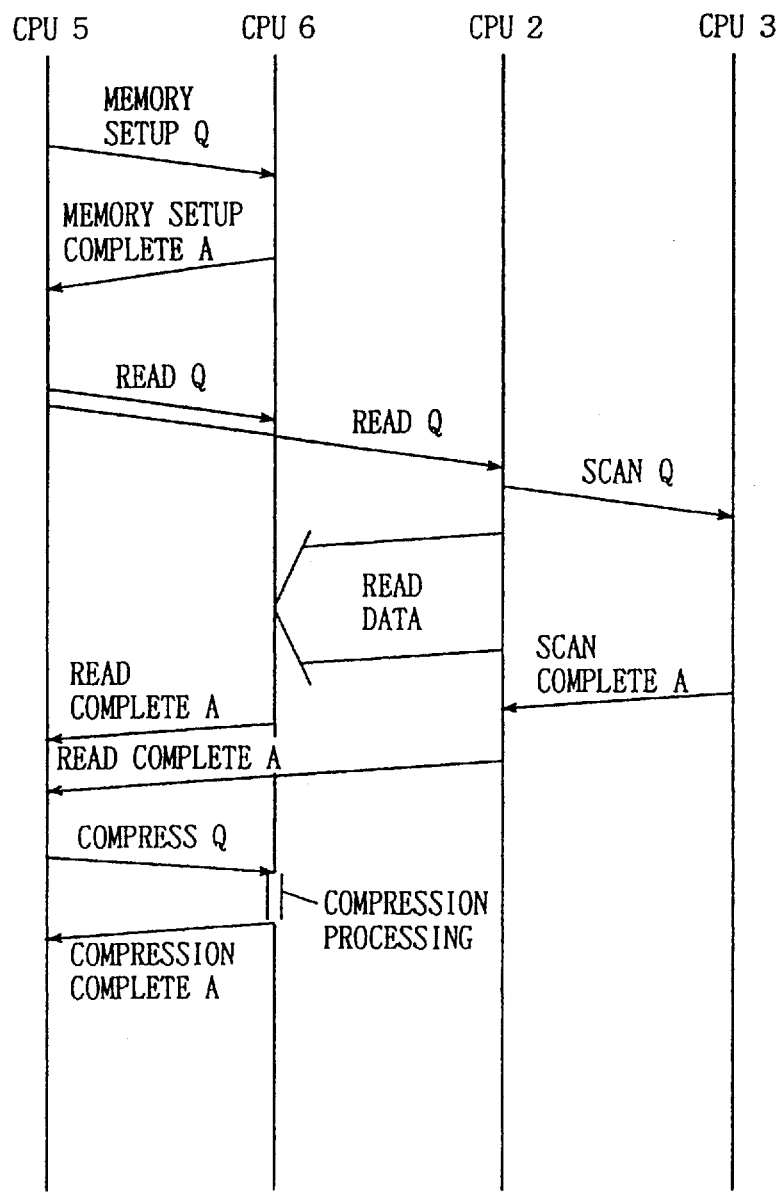
FIG. 7 shows an operational sequence of a memory mode writing operation.

FIG. 7 shows an operational sequence during a memory mode writing operation. As described above, in the memory mode writing operation, the image data is transferred from image reader IR to image memory 304.

A specific operation will be described below with reference to FIG. 7. In the figure, Q indicates a request command and A indicates a report. First, CPU 5 which controls an overall sequence outputs a memory setup request command to CPU 6. Upon receiving the command, CPU 6 carries out various setup operations for the internal hardware, such as: the setup of a connection status of switching unit 301 to transfer image data D2 supplied from image signal processing unit 20 to image memory 304, the setup for binarization (e.g., an error dispersing method, a threshold for base erasure, and a threshold for binarization), and the setup of a starting address, for writing to image memory 304, and XY length information.

When those setups are completed, CPU 6 issues a memory setup complete report to CPU 5. Upon reception of the report, CPU 5 issues a read request command to CPU 6 and CPU 2, and CPU 2 issues a scan request command to CPU 3, thereby starting scanning.

When scanning reaches the image region of the original, the read data (image data D2) is output to memory unit 30 corresponding to the image processing mode set by CPU 2.

Upon completion of reading, a read complete report is supplied respectively from CPU 6 and CPU 2 to CPU 5. Then, CPU 5 issues a compression request command to CPU 6 which sets up upon reception of the command the reading address from image memory 304, the XY length information, the writing address in code memory 306, and the mode of compressor 311 (e.g., the MH system). Then, CPU 6 starts those setup operations to carry out compression, whereby the code data is stored in code memory 306.

When compression is completed, CPU 6 issues a compression complete report to CPU 5.

Figure 8:
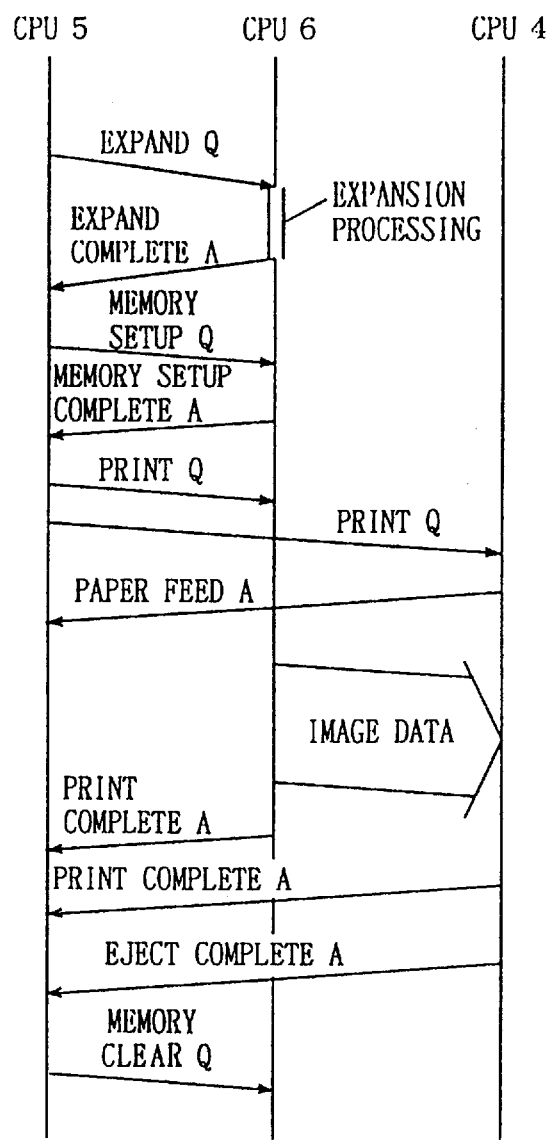
FIG. 8 shows an operational sequence of a memory mode reading operation.

FIG. 8 shows the operational sequence of the memory mode reading operation. As described above, in the memory mode reading operation, the image data is read from image memory 304 to be output to printer PRT for printing.

First, CPU 5 issues an expansion request command to CPU 6. Upon reception of the command, CPU 6 sets up the reading address from code memory 306, the data amount, the writing address in image memory 304, the XY length information, and the mode of expander 312 (e.g., the MH system). Then, CPU 6 starts those setup operations so as to carry out expansion, whereby the image data is written in image memory 304.

Upon completion of expansion, CPU 6 issues an expansion complete report to CPU 5. Next, CPU 5 issues to CPU 6 a memory setup request command for reading image data from image memory 304. Upon reception of the command, CPU 6 sets up the internal hardware, including: the connection status of switching unit 301 for outputting image data D3 to print processing unit 40 from image memory 304, the setup for rotational processing, the starting address for reading from image memory 304, and the XY length information.

When those setups are completed, CPU 6 issues a memory setup complete report to CPU 5. Upon reception of the report, CPU 5 issues a print request command to CPU 6 and CPU 4, whereby a paper feed report indicating the feeding status of sheets of paper is supplied from CPU 4 to CPU 5. Then, image data D3 read from image memory 304 is output to printer PRT for printing.

When printing is completed, CPU 6 and CPU 4 issue a print complete report (CPU 4 only) and an eject complete report to CPU 5. Upon reception of these reports, CPU 5 issues a memory clear request or the like to CPU 6 due to the operating mode.

Now, an operation of copy machine 1000 will be described below in the context of flow charts. In the following, main routines executed by CPUs 1–8 will be described first, followed by subroutines executed in each main routine.

Figure 9:
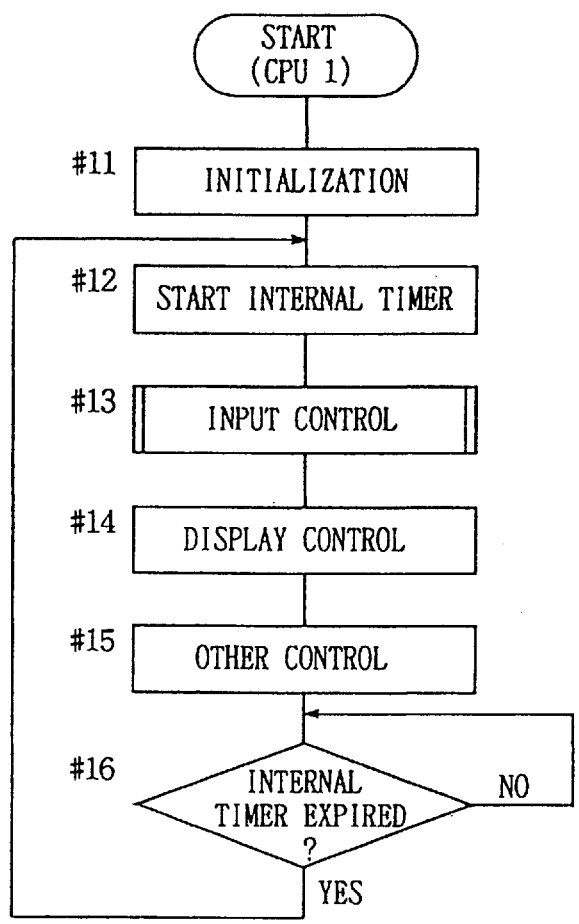
FIG. 9 is a flow chart showing a main routine of CPU 1.

FIG. 9 is a flow chart showing a main routine of CPU 1. After initialization (step #11, hereinafter the word 'step' will be omitted for simplification), an internal timer is started to supervise the time required for the routine to be constant (#12, #16), input and display control are carried out for operation panel OP and the like (#13, #14), and other control processes are also carried out (#15). It is noted that communication with the other CPUs 2–8 is carried out by interruptions.

Figure 10:
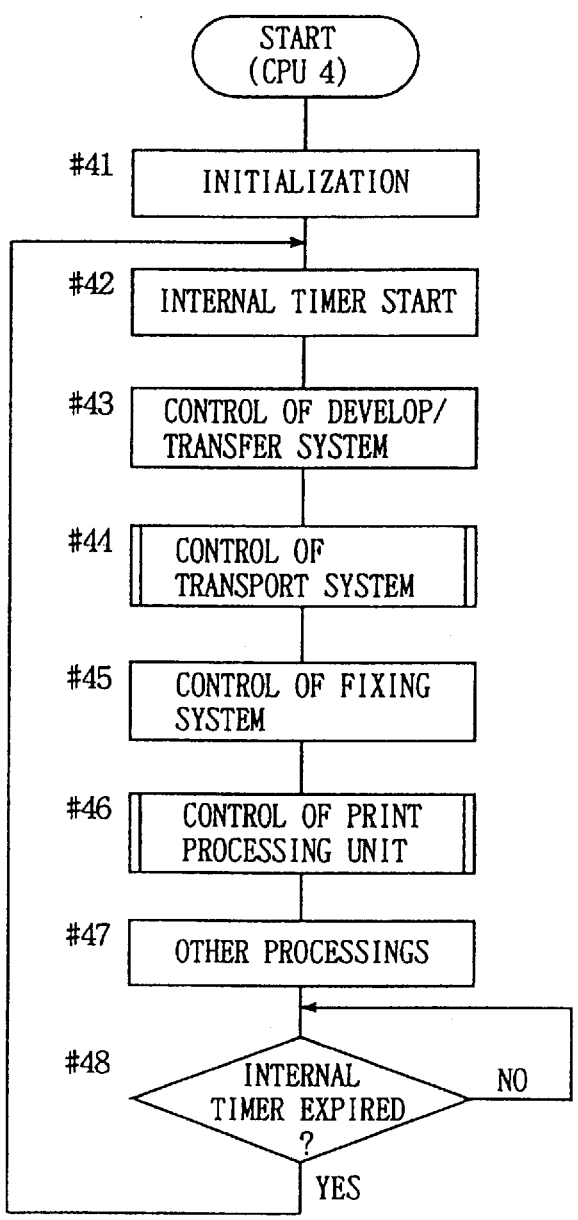
FIG. 10 is a flow chart showing a main routine of CPU 4.

FIG. 10 is a flow chart showing a main routine of CPU 4. CPU 4 controls printer PRT. After initialization and start of the internal timer (#41, #42), develop/transfer system 70A (#43), transport system 70B (#44), fixing system 70C (#45), and print processing unit 40 (#46) are controlled, respectively, and then the other processings are carried out (#47).

With regard to #44, after detection of the paper size by size detection sensors SE11 and SE12, a paper refeeding path length and an interval between sheets of paper are calculated in CPU 4, whereby the number of sheets capable of being stacked in the paper refeeding path is determined based on a calculated result. The number of sheets to be passed through the paper refeeding path can be determined based on the detected paper size, since the paper refeeding path length and the interval between sheets are constant.

Figure 11:
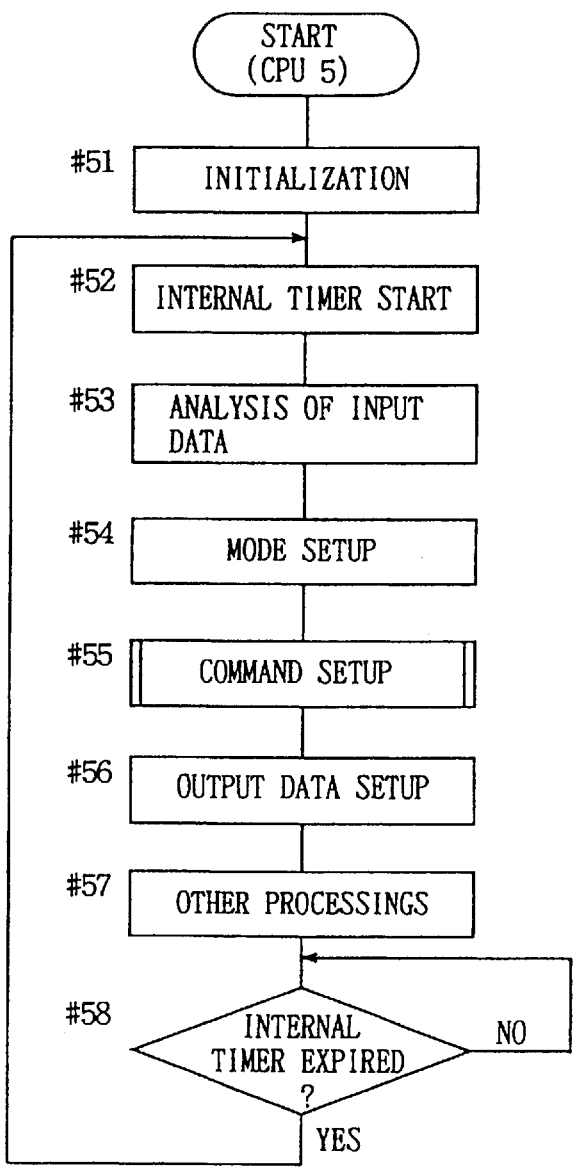
FIG. 11 is a flow chart showing a main routine of CPU 5.

FIG. 11 is a flow chart showing a main routine of CPU 5. CPU 5 issues start and stop commands to the other CPUs and sets up operating modes of those CPUs, thereby controlling an overall operation of copy machine 1000. After checking and analyzing the contents of data input through communication by interruption, if the operating mode is altered corresponding to the contents of data, then a mode set processing is carried out (#51–#54).

Control of memory writing/reading corresponding to the copying mode is carried out during command setup in #55. The data is set in an output area for output through communication (#56).

Figure 12:
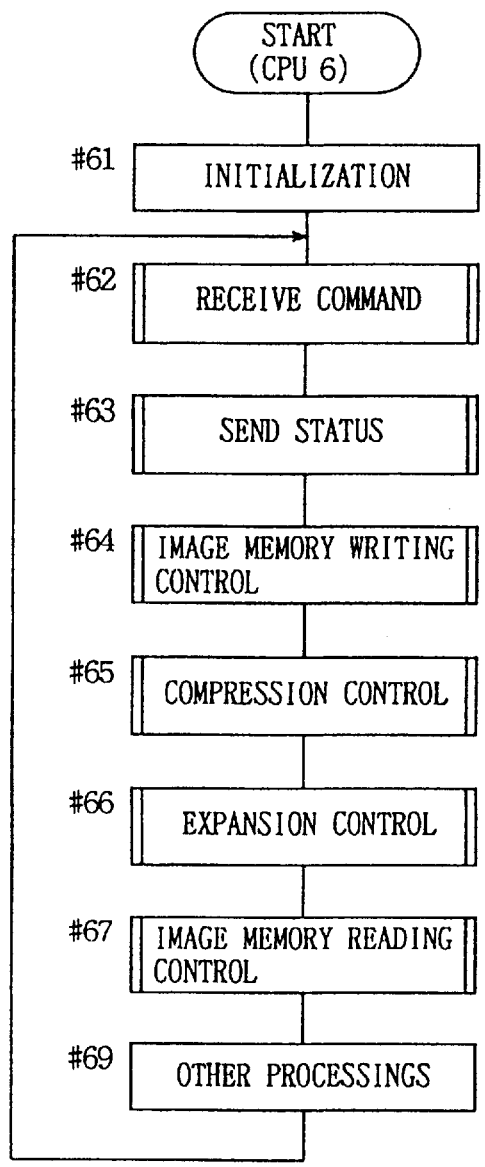
FIG. 12 is a flow chart showing a main routine of CPU 6.

FIG. 12 is a flow chart showing a main routine of CPU 6 which controls memory unit 30. CPU 6 receives commands from other CPUs (#62), sends a status (#63), controls writing to image memory 304 (#64), controls compression (#65), controls expansion (#66), and controls reading from image memory 304 (#67).

Figure 13:
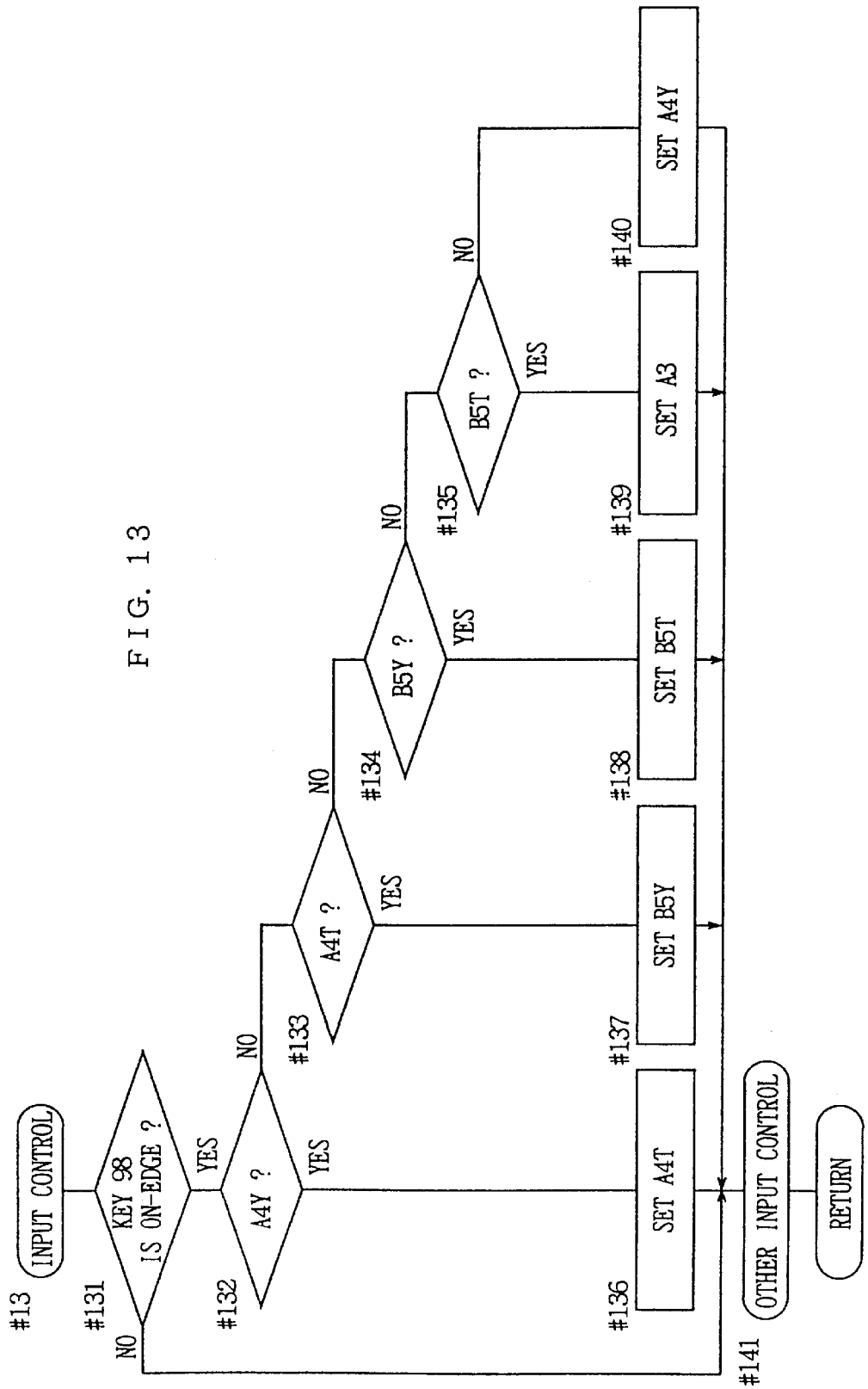
FIG. 13 is a flow chart showing a control subroutine for input.

FIG. 13 is a flow chart showing a subroutine for input control indicated by #13 in FIG. 9. First, it is determined whether or not an on-edge (which is defined as change in status where a switch, a sensor, a signal or the like changes from a off state to a on state) of paper select key 98 is detected in #131. If it is detected (YES in #131), then a newly selected paper size is set (#136–#140) corresponding to the paper size being selected at that time (#132–#135).

Figure 14:
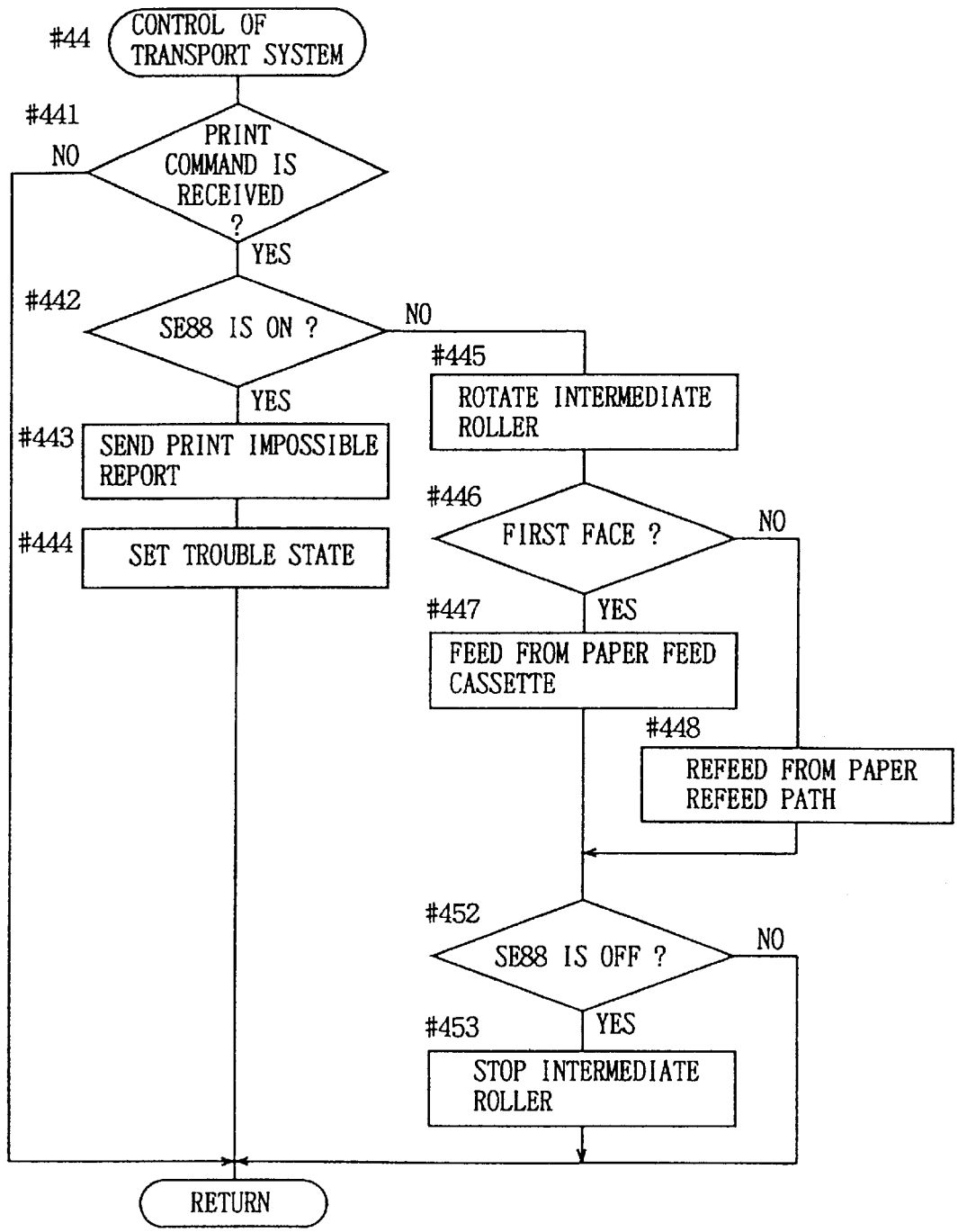
FIG. 14 is a flow chart showing a control subroutine of a transport system.

FIG. 14 is a flow chart showing a control subroutine of the transport system indicated by #44 in FIG. 10. First, a determination is made whether a print command is received from CPU 5 (#441). If it is received (YES in #441), a determination is made whether or not the sheet of paper corresponding to the print command has reached sensor SE88 which is located before the intermediate roller 87 in

442. If the sheet has reached sensor SE88 (YES in #442), indicating delay of the print command, a print impossible report is transmitted to CPU 5 in #443 and at the same time a trouble state is set in #444.

If the sheet has not reached sensor SE88 yet in #442 (NO in #442), then the intermediate roller 87 is rotated in #445, and at the same time, it is determined whether the received command corresponds to the first face (i.e., an unprinted face) or the second face (i.e., a back face of the sheet whose first.face is already printed) in #446. In the case of the first face (YES in #446), sheets of paper are fed from the paper feed cassette in #447, while in the case of the second face (NO in #446), sheets of paper transported from the paper refeeding path are refed in #448.

Subsequently, when the sheet passing through sensor SE88 is detected in #452, the intermediate roller 87 is stopped (#453).

Figure 15:
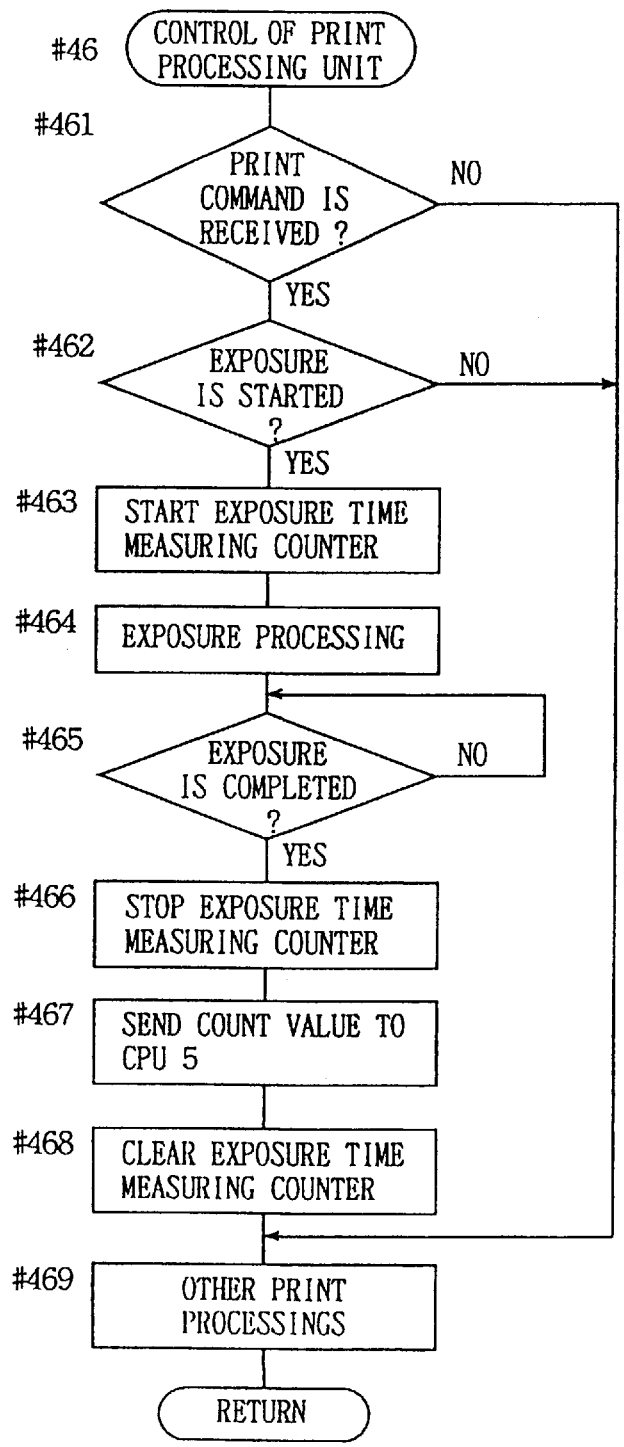
FIG. 15 is a flow chart showing a control subroutine of a print processing unit.

FIG. 15 is a flow chart showing a subroutine for controlling a print processing unit indicated by #46 in FIG. 10. This subroutine will be described below with reference to FIG. 15. If reception of the print command is detected in (YES in #461), then determination a is made as to whether or not exposure of photoreceptor drum 71 with light has started in #462. Upon start of exposure (YES in #462), an exposure time measuring counter is started (#463) and exposure processing is started in #464. Upon completion of exposure (YES in #465), the exposure time measuring counter is stopped in #466 and a count value from the counter is sent to CPU 5 (#467). The value in the counter is cleared to "0" in #468. Other printing processings are then carried out in #469.

Figure 16:
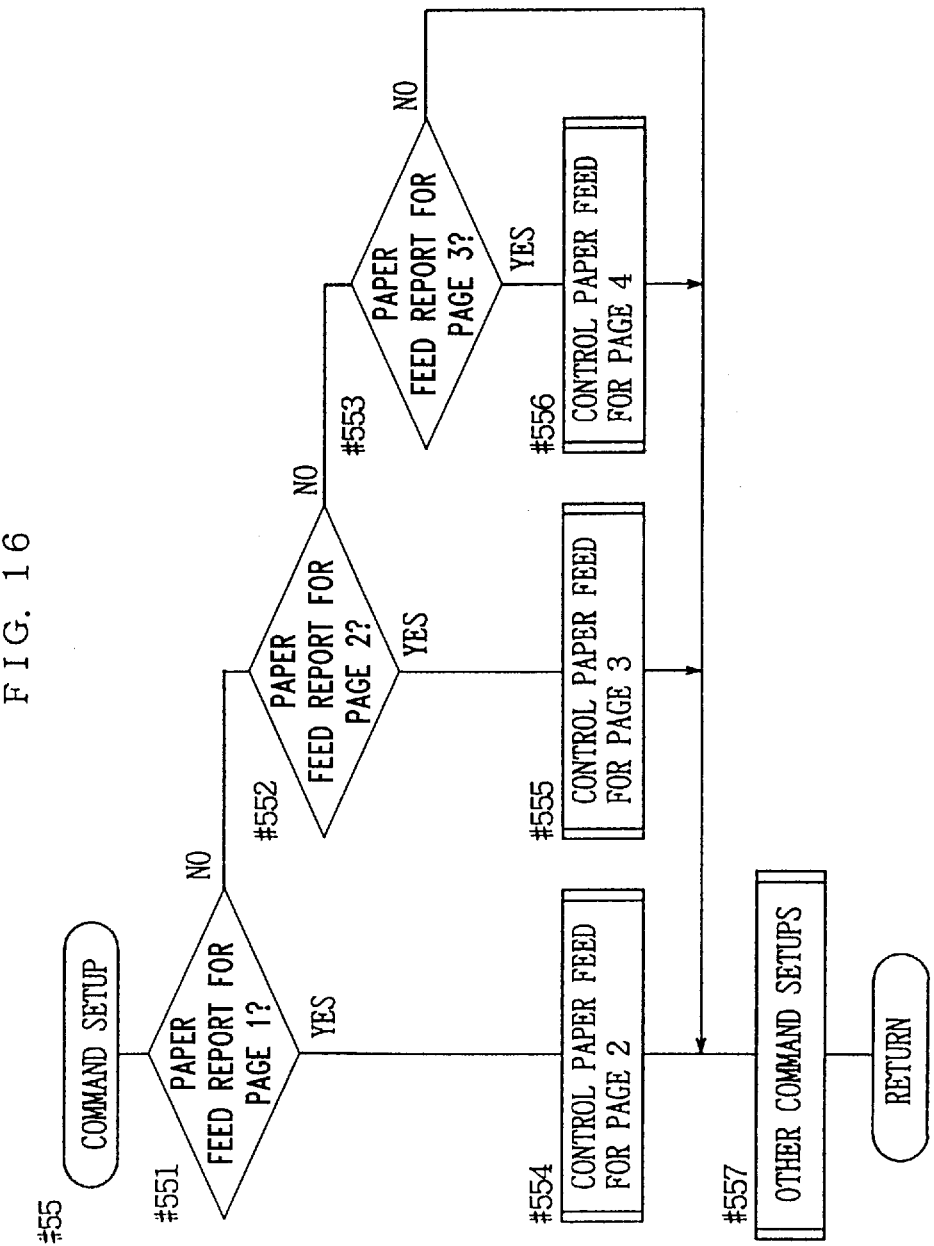
FIG. 16 is a flow chart showing a subroutine for command setup.

FIG. 16 is a flow chart showing a subroutine for command setup indicated by #55 in FIG. 11. This subroutine will be described below with reference to FIG. 16. The existence of a paper feed report is determined in #551–#553. If the paper feed report is detected (YES in #551–553), the sheet of paper of the corresponding page, whether fed or refed, is controlled (#554–#556). The other command setups are subsequently carried out (#557).

Figure 17:
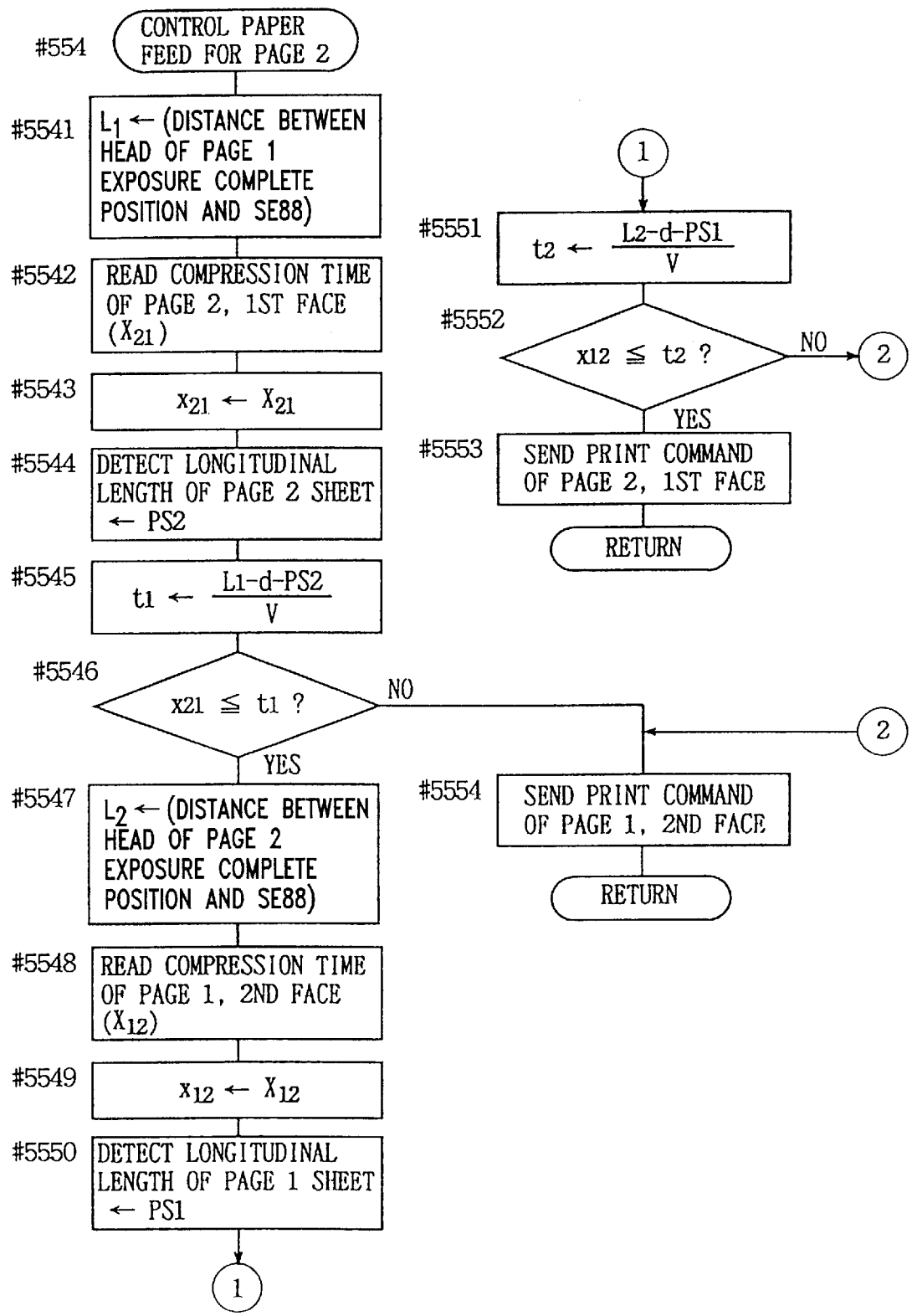
FIG. 17 is a flow chart showing a control subroutine for page 2 feed.
Figure 18A:
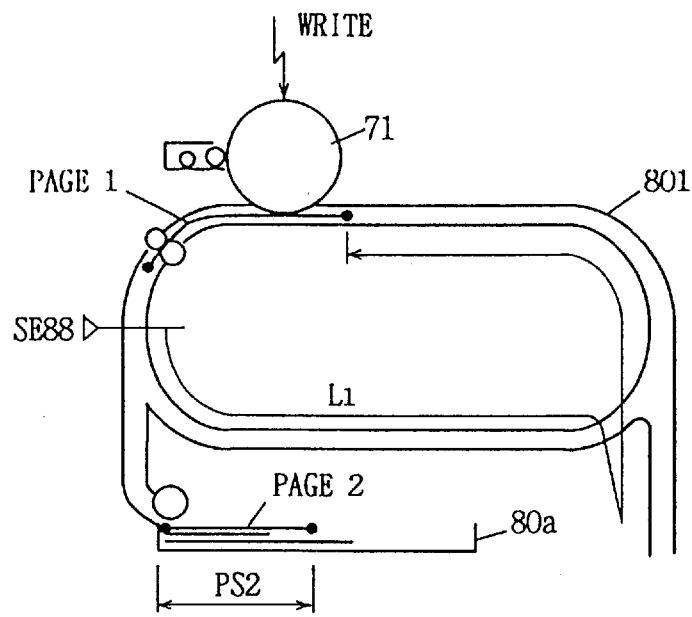
FIGS. 18a and 18b show schematic diagrams showing how page 2 is fed.
Figure 18B:
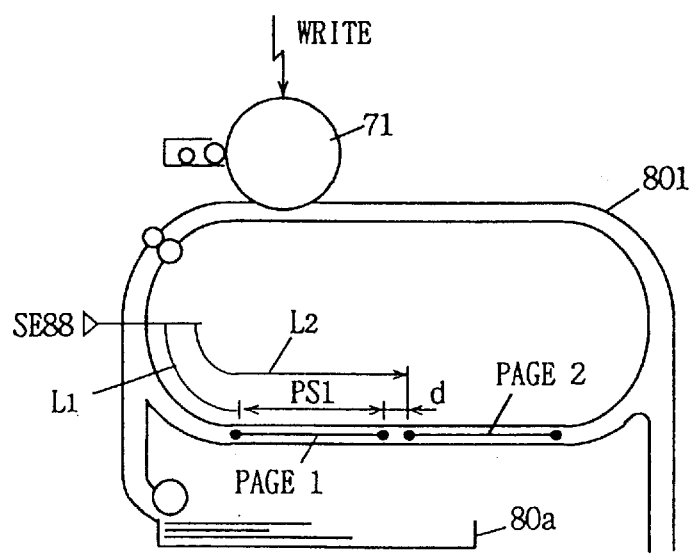

FIG. 17 is a flow chart showing a subroutine for controlling a page 2 feed indicated by #554 in FIG. 16. FIGS. 18a and 18b are schematic diagrams for use in explaining this state, in which FIG. 18a corresponds to #5541–#5546 and FIG. 18b corresponds to #5547–5543 which will be described below. It is noted that a path consisting of image forming system 70, paper refeeding unit 600 and the like is indicated as a loop path 801 in the figures for simplification. The flow chart for this subroutine will be described below with reference to FIGS. 17, 18a, and 18b. First, in #5541, a distance $L_1$, measured from from the head of page 1 at an exposure complete position to SE88, is detected. Then, in #5542, a compression time $X_{21}$ of data corresponding to the first face of page 2 is read from management table MT1 shown in FIG. 6. A time necessary to expand the data is set to "$x_{21}$" (#5543), and a longitudinal length PS2 of page 2 is detected based on the page size of page 2 (#5544).

Subsequently, a value $(L_1\text{-d-PS2})/V$ is set for $t_1$, where d represents a predetermined interval between sheets of paper and V represents a system speed.

A determination is made whether the expansion time $x_{21}$ is within $t_1$ in #5546. If it is determined that expansion time $x_{21}$ is longer than $t_1$ (NO in #5546), the print command for the second face of page 1 is sent in #5554 so as not to feed sheets of paper from the paper feed cassette 80a, 80b, because the sheet for page 2 might collide with the refed sheet of page 1.

If $x_{21}$ is within $t_1$ in (YES in #5546), then a distance $L_2$ from the head of page 2 at the exposure complete position to sensor SE88 is calculated in #5547. In #5548, a compression time $(X_{12})$ of the data to be printed on the second face of page 1 is read from management table MT1, and a time necessary for expansion $(X_{12})$ is set. The longitudinal length of the sheet of page 1 is detected (#5549, #5550), whereby a value $(L_2\text{-d-PS1})/V$ is set for $t_2$ (#5551).

Then, determination a is made whether or not expansion time $x_{12}$ is within $t_2$ (#5552). If $x_{12}$ is determined to be longer than $t_2$ (NO in #5552), then the print command might not be supplied before the sheet to be refed reaches SE88. Therefore, the print command for the second face of page 1 is sent without feeding the sheet of page 2 (#5554).

On the other hand, if $x_{12}$ is determined to be within $t_2$ (YES in #5552), then the print command for the first face of page 2 is sent in #5553, because the sheet for page 2 will not collide with the sheet for page 1 (YES in #5546) and the sheet for page 2 does not cause delay of the print command for the second face of page 1 (YES in #5552).

Figure 19:
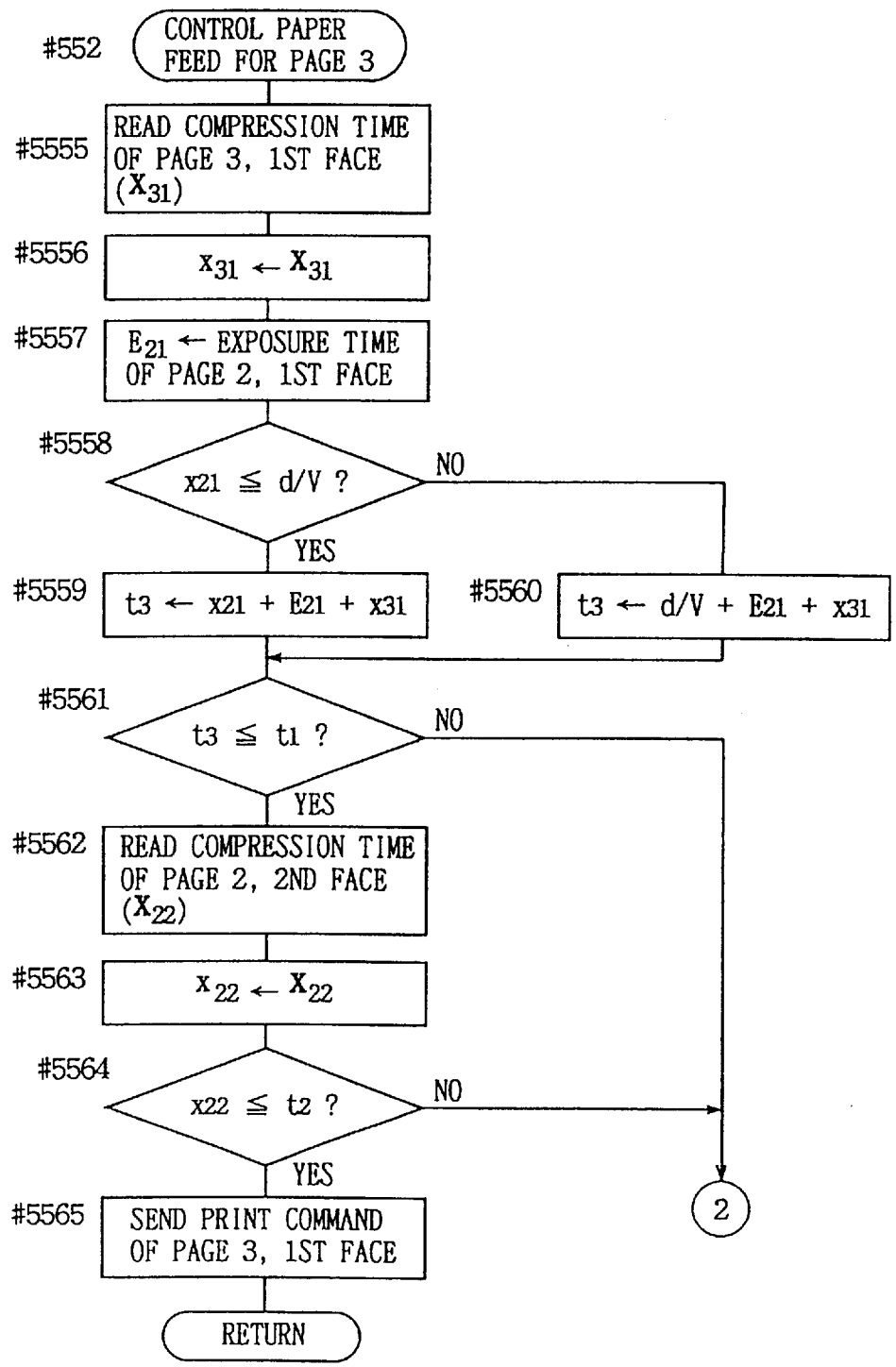
FIG. 19 is a flow chart showing a control subroutine for page 3 feed.

FIG. 19 is the flow chart showing a subroutine for controlling paper feed of page 3 indicated by #555 in FIG. 16. Referring to FIG. 19, compression time $X_{31}$ of data to be printed on the first face of page 3 is read in #5555 and the time required for expansion $(X_{31})$ is set #5556. The exposure time $E_{21}$ photoreceptor drum 71 required for the first face of page 2 is detected (#5557). A determination is then made as to whether or not time $x_{21}$ taken for expansion of the first face of page 2 is longer than d/V, in other words, the time necessary to travel by the interval between sheets (#5558).

If the expansion time is longer than the time necessary to travel through interval d (YES in #5558), then $t_3$ is set to a value of $x_{21}+E_{21}+x_{31}$ (#5559). If time $x_2l$ necessary for expansion is within d/V (NO in #5558), then $t_3$ is set to a value of $d/V+E_{21}+x_{31}$.

Subsequently, a determination is made whether $t_3$ is within $t_1$ is determined (#5561). If $t_3$ is within $t_1$ (YES in #5561), then compression time $X_{22}$ of data to be printed on the second face of page 2 is read (#5562), and this time is set as the expansion time $(X_{22})$(#5563). Then, a determination is made whether expansion time $x_{22}$ is within $t_2$ (#5564). If expansion time $X_{22}$ is within $t_2$ (YES in #5564), then a condition of YES is satisfied in both #5561 and #5564. This state is similar to satisfaction of both YES conditions in previous #5546 and #5552, whereby the print command for the first face of page 3 is sent in #5565.

If either #5561 or #5564 is NO, however, the print command for the second face of page 1 is sent (#5554) so that the sheet of paper is not fed from the paper feed cassette 80a, 80b.

Figure 20:
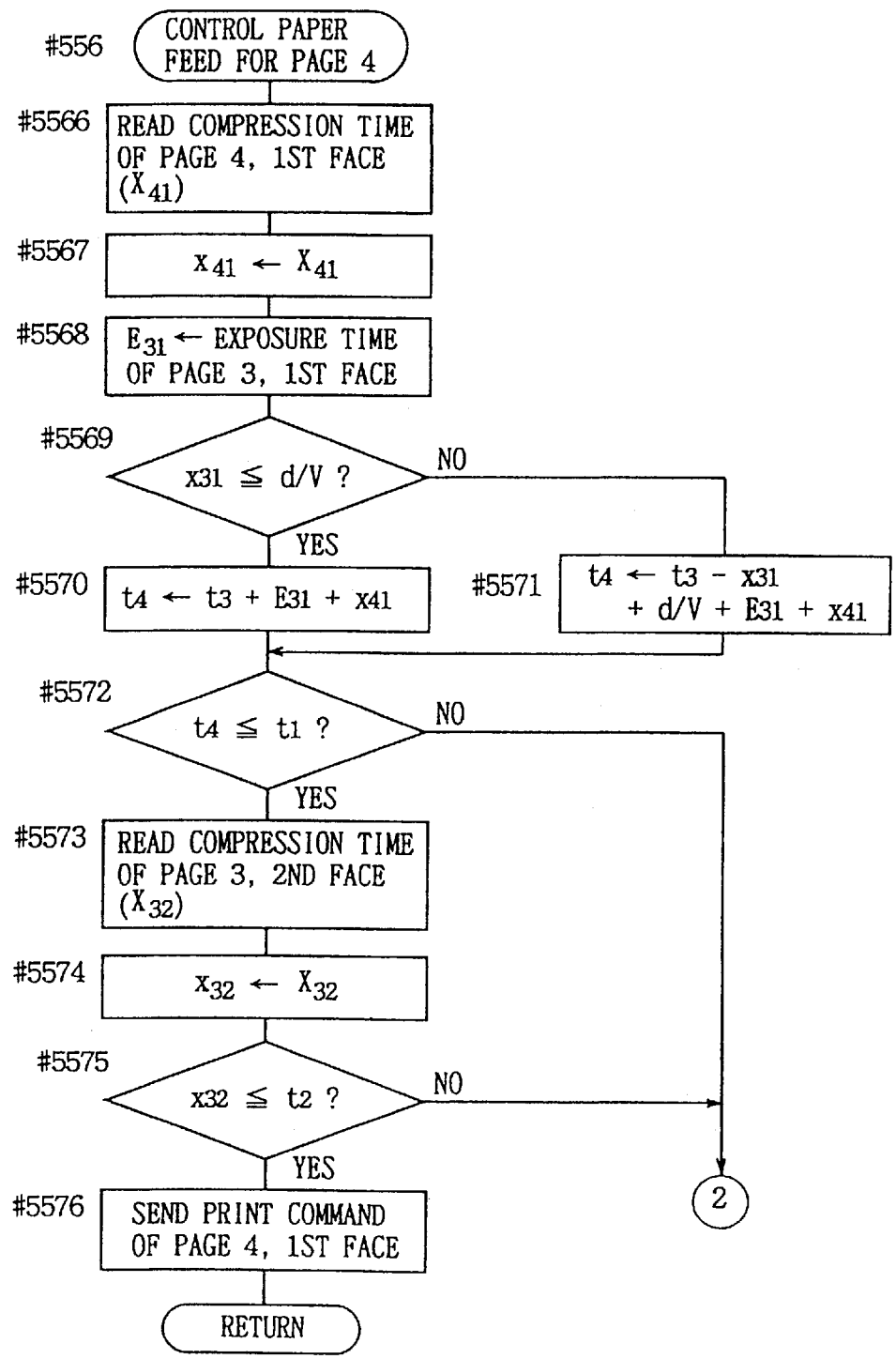
FIG. 20 is a flow chart showing a control subroutine for page 4 feed.

FIG. 20 is a flow chart showing a subroutine for controlling paper feed of page 4 indicated by #556 in FIG. 16. The contents of the page 4 paper feed control subroutine are basically the same as those of the page 3 paper feed control subroutine shown in FIG. 19. More specifically, with reference to FIG. 20, the compression time $(X_{41})$ of data to be printed on the first face of page 4 is read, the time taken for expansion is set for $x_{41}$, and then the exposure $E_{31}$ for photoreceptor drum 71 required for the first face of page 4 is detected (#5566–#5568).

Then, the comparison is made between the time required for expansion of the first face of page 3 and the time taken to travel through interval d paper (#5569). In response to the comparison result, $t_4$ is determined, and whether or not the value is within $t_1$ is determined (#5570, #5571). If $t_4$ is within $t_1$, (YES in #5572), compression time $X_{32}$ of the data to be printed on the second face of page 3 is read and set as expansion time $X_{32}$ (#5573–#5574). If expansion time $x_{32}$ is within $t_2$ (YES in #5575), then the print command for the first face of page 4 is sent (#5576). If $t_4$ is greater than $t_1$ or $x_{32}$ is greater than $t_2$ (NO in #5572 or #5575), the print command for the second face of page 1 is sent (#5554 in FIG. 17), so that the sheet of paper will not be fed from the paper feed cassette 80a, 80b.

Figure 21:
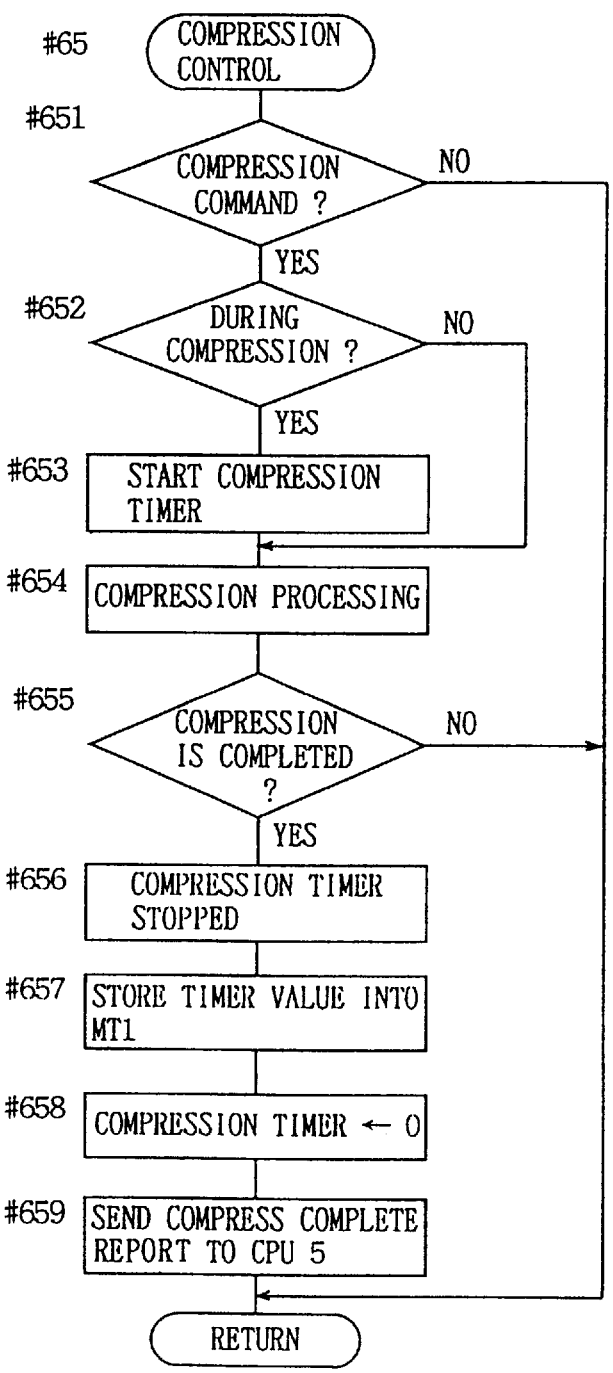
FIG. 21 is a flow chart showing a control subroutine for compression.

FIG. 21 is a flow chart showing the contents of the compression control subroutine indicated by #65 in FIG. 12. With reference to FIG. 21, in the compression control subroutine, upon reception of the compression command (#651), the compression timer is started (#653) and compression processings undertaken (#654), provided however, compression is being carried out (YES in #652).

When the compression is completed (YES in #655), then the compression timer is stopped, (#656), and the time value taken for compression is stored in MT1 (#657). After reset of the compression timer (#658), the compression complete report is sent to CPU 5 (#659).

Through the above-described control, occurrence of paper jam can be prevented. At the same time, highly effective outputs from the image forming system can be achieved. Consequently, the reliability and usability in digital copy machines can be improved.

In the embodiment described above, the compression time is measured so that the measured time is regarded as the expansion time. However, in the event where the data which was actually expanded once is to be reexpanded and output as in the electronic soft mode, the first expansion time can be regarded as being identical to the compression time in carrying out expansion, and the expansion time is actually measured so that the measured time can be treated as the expansion time in carrying out the second expansion. By doing this, the expansion time can be detected more accurately.

The expansion time is measured by CPU 6 and the measurement value can be stored in a RAM 126. Such a processing is carried out in the subroutine for controlling expansion indicated by #66 in FIG. 12 although not shown specifically.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A copy machine, comprising:
    an image reader for reading image data of an original and for outputting the read data;
    an image signal processing unit for compressing the data read by said image reader and for expanding the compressed data;
    a memory for storing compressed data for a plurality of originals compressed by said image processing unit;
    an image forming unit for expanding, by said image processing unit, the compressed data stored in said memory and for forming an image on a sheet of paper based on the expanded data;
    a paper feed cassette for feeding sheets of paper to said image forming unit;
    a paper refeeding path for refeeding a sheet of paper to said image forming unit after reversing the sheet so that an image is formed on a back face of the sheet on which an image is already formed by said image forming unit, said paper refeeding path accommodating one or more sheets of paper;
    detecting means for detecting an expansion time for expanding compressed data stored in said memory;
    calculating means for calculating a time necessary to refeed from said paper refeeding path a sheet on which an image is already formed by said image forming unit; and
    switching means for switching from image formation with paper fed from said paper feed cassette to image formation with paper fed from said paper refeeding path, based on a comparison between a detection result of said detecting means and a value calculated by said calculating means.

2. The copy machine according to claim 1, wherein
    said detecting means includes time measuring means for estimating an expansion time based on a measurement result of the time measuring means, and wherein said time measuring means measures time required to compress the image data read by said image reader.

3. The copy machine according to claim 2, further comprising a variable scale magnification means, wherein
    said variable scale magnification means applies variable scale magnification processing to the image data corresponding to the paper size fed from said paper feed cassette and said paper refeeding path, and wherein said detecting means also detects a time necessary for said variable scale magnification processing.

4. The copy machine according to claim 1, further comprising a plurality of paper feed cassettes, said cassettes being adapted to accommodate one or more paper sizes.

5. The copy machine according to claim 4, further comprising a size sensor for detecting a size of an image of an original, and paper size selecting means for selecting an appropriate sized sheet of paper based on a detection result of the size sensor.

6. An image forming apparatus, comprising:
    image capturing means for capturing image data of a plurality of originals;
    compressing means for compressing the image data captured by said image capturing means;
    a memory for storing the data compressed by said compressing means;
    expanding means for expanding the data stored in said memory to data consisting of pixels;
    image forming means for reproducing the image data on a sheet of paper based on the data expanded by said expanding means;
    paper feeding means for feeding one or more sheets of to said image forming means one at a time;
    an image duplexing path consisting of a reversing path for reversing a sheet of paper having image data formed on a first face thereof by said image forming means and a paper refeeding path for refeeding the reversed sheet to said image forming means, said image duplexing path being adapted to simultaneously accommodate a plurality of paper sheets;
    detecting means for detecting an expansion time required to expand the data stored in said memory for each original;
    calculating means for calculating a time required to transport a leading sheet of paper out of said image duplexing path to said image forming means; and
    a controller for comparing a calculation result of said calculating means with a detection result of said detecting means, and based on a comparison result, for controlling whether an image is formed on a second face of the leading sheet in said image duplexing path or an image is formed on a first face of a sheet newly fed from said paper feeding means.

7. The image forming apparatus according to claim 6, further comprising time measuring means for measuring a time required to compress the image data of an original captured by said image capturing means, wherein said detecting means estimates the expansion time based on a measurement result from said time measuring means.

8. The image forming apparatus according to claim 7, being at least one component of an electro-photography system including a semiconductor laser and a photoreceptor.

9. The image forming apparatus according to claim 7, wherein said controller compares a sum of the expansion time of the image to be recorded on the sheet of paper newly fed from said paper feeding means and a time taken for forming the image on the sheet of paper with the calculation result of said calculating means, and said controller forms the image on the first face of the sheet newly fed from said paper feeding means if the calculation result of said calculating means is greater than said sum and forms the image on the second face of the leading sheet in said image duplexing path if the calculation result of said calculating means is smaller than said sum.

10. The image forming apparatus according to claim 6, wherein said paper feeding means is adapted to feed a plurality of types of paper sheets.

11. A digital duplex copy machine which copies a (N)th original image, N being an odd number, on a first face of a sheet of paper, and copies a (N+1)th image on a second face of the sheet of paper, comprising:

an image reader for reading image data of an original and for outputting the read data;

compressing means for compressing the image data output from said image reader;

a memory for storing the data compressed by said compressing means;

expanding means for expanding the data stored in said memory into data consisting of pixels;

image forming means for forming said image data of the original on a sheet of paper based on the data expanded by said expanding means;

paper feeding means for feeding sheets of paper to said image forming means one at a time;

an image duplexing path consisting of a reversing path for reversing first and second faces of a sheet of paper and a paper refeeding path for refeeding a reversed sheet of paper to said image forming means, and serving as a loop transporting path adapted to simultaneously accommodate a plurality of paper sheets; and control means for forming a Nth image on a sheet of paper fed from said paper feeding means and sending the sheet to the image duplexing path, and successively, forming a (N+2)th image on a newly-fed sheet from said paper feeding means, wherein said control means determines whether a (N+4)th image can be expanded and formed on another newly-fed sheet before the (N+1)th image is expanded from said memory after the sheet having the Nth image formed thereon in said image duplexing path is reversed, wherein the (N+4)th image is formed if a positive determination is made, and the (N+1)th image is formed if a negative determination is made.

12. A digital copy machine, comprising:

an image reader for reading image data of an original image and outputting the read data;

compressing means for compressing the read data output from said image reader;

a memory for storing the data compressed by said compressing means;

expanding means for expanding the data stored in said memory into data consisting of pixels;

image forming means for reproducing the original image on a sheet of paper based on the data expanded by said expanding means;

paper feeding means for feeding paper, one sheet at a time, to said image forming means; and a loop transporting path consisting of,
a reversing path for reversing first and second faces of a sheet of paper, and
a paper refeeding path for refeeding a reversed sheet to said image forming means, being adapted to simultaneously accommodate a plurality of paper sheets, wherein a maximum number of sheets having the first face thereof printed and subject to transportation in a loop by said loop transporting path in a first step is N;

a maximum number of sheets having a first face thereof printed and subject to transportation in a loop by said loop transporting path in a second step is M, said N is different from said M, and a number of sheets to be transported by said loop transporting path is determined by the expansion time of the original image and the size of the sheet of paper to be transported.

* * * * *